(12) United States Patent
Gutekunst et al.

(10) Patent No.: US 10,331,112 B2
(45) Date of Patent: Jun. 25, 2019

(54) INFORMATION DISPLAY OF AN IO-LINK MODULE

(71) Applicant: Balluff GmbH, Neuhausen a. d. F. (DE)

(72) Inventors: Juergen Gutekunst, Nuertingen (DE); Winfried Kunzweiler, Ebersbach a.d.F. (DE); Holger Haupt, Magdeburg (DE); Matthias Beyer, Stuttgart (DE)

(73) Assignee: Balluff GmbH, Neuhausen a. d. F. (DE)

( * ) Notice: Subject to any disclaimer, the term of this patent is extended or adjusted under 35 U.S.C. 154(b) by 75 days.

(21) Appl. No.: 15/562,936

(22) PCT Filed: Apr. 1, 2015

(86) PCT No.: PCT/DE2015/100142
§ 371 (c)(1),
(2) Date: Sep. 29, 2017

(87) PCT Pub. No.: WO2016/155685
PCT Pub. Date: Oct. 6, 2016

(65) Prior Publication Data
US 2018/0088563 A1  Mar. 29, 2018

(51) Int. Cl.
*G09G 3/34* (2006.01)
*H04L 12/40* (2006.01)
*G05B 19/418* (2006.01)

(52) U.S. Cl.
CPC ... *G05B 19/41845* (2013.01); *G05B 19/4183* (2013.01); *G09G 3/344* (2013.01); *H04L 12/40013* (2013.01); *H04L 12/40019* (2013.01); *H04L 12/40045* (2013.01)

(58) Field of Classification Search
CPC ......... G02F 1/167; G09G 9/372; G09G 3/344
See application file for complete search history.

(56) References Cited

U.S. PATENT DOCUMENTS

| | | | |
|---|---|---|---|
| 5,751,257 A | * | 5/1998 | Sutherland .............. G06F 3/147 235/383 |
| 6,477,457 B1 | | 11/2002 | Fendt et al. |
| 9,065,776 B2 | | 6/2015 | Tran et al. |

(Continued)

FOREIGN PATENT DOCUMENTS

| | | |
|---|---|---|
| DE | 198 13 955 A1 | 9/1999 |
| GB | 2 468 274 A | 9/2010 |
| WO | 2011/095857 A1 | 8/2011 |

OTHER PUBLICATIONS

International Search Report of PCT/DE2015/100142, dated Jul. 20, 2015.

(Continued)

*Primary Examiner* — Laurence J Lee
(74) *Attorney, Agent, or Firm* — Collard & Roe, P.C.

(57) ABSTRACT

An IO link module has at least one electrical terminal for connecting an electronic device and an electronic display device for displaying connection identification information of the at least one terminal. The display device is designed to permanently display the connection identification information free of a power supply using an electrical energy source which is independent of the IO link module.

13 Claims, 4 Drawing Sheets

(56) References Cited

U.S. PATENT DOCUMENTS

| | | | |
|---|---|---|---|
| 2003/0222139 A1* | 12/2003 | Stephenson | G06F 3/14 235/383 |
| 2009/0194226 A1* | 8/2009 | Tabet | H04Q 1/13 156/230 |
| 2010/0151710 A1* | 6/2010 | AbuGhazaleh | H01R 13/6466 439/78 |
| 2011/0008996 A1* | 1/2011 | Pinn | H04Q 1/136 439/489 |
| 2012/0317426 A1 | 12/2012 | Hunter, Jr. et al. | |
| 2013/0188966 A1* | 7/2013 | Wu | H04B 10/27 398/139 |
| 2013/0300732 A1* | 11/2013 | Hosoya | G06F 1/1652 345/419 |
| 2017/0206047 A1* | 7/2017 | Halterman | G06F 3/147 |

OTHER PUBLICATIONS

IEC 61131-9, Edition 1.0, Sep. 2013, "Programmable controllers—Part 9: Single-drop digital communication interface for small sensors and actuators (SDCI)," total of 576 pages.

ISO 15745-1, First edition, Mar. 1, 2003, "Industrial automation systems and integration—Open systems application integration framework—Part 1: Generic reference description," total of 40 pages.

ISO 15745-1 Amendment 1, Apr. 1, 2007, "Industrial automation systems and integration—Open systems application integration framework—Part 1: Generic reference description—Amendment 1," total of 16 pages.

ISO 15745-2, First Edition, Nov. 15, 2003, "Industrial automation systems and integration—Open systems application integration framework—Part 2: Reference description for ISO 11898-based control systems," total of 170 pages.

ISO 15745-3, First Edition, Nov. 15, 2003, "Industrial automation systems and integration—Open systems application integration framework—Part 3: Reference description for IEC 61158-based control systems," total of 276 pages.

ISO 15745-4, First Edition, Nov. 15, 2003, "Industrial automation systems and integration—Open systems application integration framework—Part 4: Reference description for Ethernet-based control systems," total of 132 pages.

ISO 15745-4 Amendment 1, Feb. 15, 2006, "Industrial automation systems and integration—Open systems application integration framework—Part 4: Reference description for Ethernet-based control systems—Amendment 1: PROFINET profiles," total of 56 pages.

ISO 15745-4 Amendment 2, Feb. 1, 2007, "Industrial automation systems and integration—Open systems application integration framework—Part 4: Reference description for Ethernet-based control systems—Amendment 2: Profiles for Modbus TCP, EtherCAT and ETHERNET Powerlink," total of 174 pages.

ISO 15745-5, First Edition, Feb. 1, 2007, "Industrial automation systems and integration—Open systems application integration framework—Part 5: Reference description for HDLC-based control systems," total of 96 pages.

\* cited by examiner

INFORMATION DISPLAY OF AN IO-LINK MODULE

CROSS REFERENCE TO RELATED APPLICATIONS

This application is the National Stage of PCT/DE2015/100142 filed on Apr. 1, 2015, the disclosure of which is incorporated by reference. The international application under PCT article 21(2) was not published in English.

The invention relates to an IO-link module, a method for operating the IO-link module, a control device for controlling an information display of an IO-link module, a method for controlling an information display of an IO-link module, a computer program as well as a computer program product.

PRIOR ART

In mechanical and plant engineering as well as in automation technology, numerous standardised fieldbus systems have proved to be expedient as an alternative to parallel individual cabling. In this case, a plurality of so-called fieldbus modules is connected to a central control device via the fieldbus. Devices are connected to the fieldbus modules in turn. More recently, IO-link connections have been used to connect the devices to the fieldbus modules. In this case, the fieldbus modules assume the role of an IO-link master. An IO-link device can also be connected to an IO-link master and connected to devices which are designed, for example, as sensors, actuators, display devices, operating devices and smaller drives present on machines.

In many assembly systems, the space requirement for cabling and for switch boxes for electrical installation exceeds the assembly space for the handling mechanism. Furthermore, the costs for the working hours and the material cost of installing the hardware for signal transmission to the machine can be higher than the purchase prices of the connected binary sensors and actuators. To avoid costly cabling, sensors with analogue signals or serial interfaces, multi-channel parameterisable sensors or devices with diagnostic functions have often been dispensed with for cost reasons, even if it would make sense to use them. To address this problem, a new standard for an intelligent sensor/actuator interface referred to as "IO-link" has been specified, which is to be standardised as an open standard in the standard IEC 61131-9. IO-link modules in the form of IO-link masters and IO-link devices, i.e. modules that have at least one IO-link interface, are described by description files IODD (IO-link device description), which are standardised as an open standard as the description language in the standard ISO 15745.

Such an IO-link module typically has a plurality of electrical terminals for connecting a respective electronic device, which are formed, for example, to be analogue, digital or as an IO-link connection. A surface of the IO-link module is usually provided with a number of terminal labels which corresponds to the number of terminals. Here, the terminal labels contain a terminal identification information, i.e. an information about an identification of the corresponding terminal, in order to facilitate cabling of the terminals and/or to permanently display the terminal identification information in particular during assembly and/or operation. This type of information display of the terminal identification information is costly since the labels must be printed individually for each terminal of each IO-link module with a special printer. Furthermore, the production of these labels may be prone to errors, and the labels must be produced again in the event of a reallocation of a terminal and/or a replacement of modules.

DISCLOSURE OF THE INVENTION

It is an object of the invention to provide measures with which a simple, flexible and error-free permanent identification of terminals of an IO-link module is provided.

According to a first aspect of the invention, an IO-link module is provided which has at least one electrical terminal for connecting an electronic device and an electronic display device for displaying at least one terminal identification information of the at least one terminal, wherein the display device is configured to permanently display the terminal identification information free from an energy supply by means of an electrical energy source which is independent of the IO-link module. Here, the term IO-link module can refer to a module, for example a component, which at least has one IO-link interface and optionally a fieldbus interface. The term "an electrical energy source which is independent of the IO-link module" can refer to an energy source which can operate independently of the IO-link module. In particular, the energy source can be provided externally with respect to the IO-link module, i.e. not integrated in the IO-link module.

According to the invention, the terminal labels on a surface of an IO-link module can be replaced by an electronic display device, in particular attached to the surface of the IO-link module, said display device displaying the terminal identification information for a terminal arranged adjacently, for example, for an electronic device, such as, for example, a sensor, an actuator, a display device, an operating device, a small drive of a machine or another IO-link module, permanently and without an additional independent energy supply. Here, an IO-link module can be a module, in particular an infrastructure device of a fieldbus system, having an IO-link interface. The terminals can be analogue, digital and/or IO-link based. This embodiment of the IO-link module can enable a terminal identification for the electrical terminal of the IO-link module which can be adjusted individually due to a flexibility of the display device, said terminal identification being error-free and particularly easy to implement. Furthermore, the electronic display device can save energy during operation and therefore be cost-effective. The electronic display device can also provide new degrees of freedom in the design of a module housing of the IO-link module since, for example, even the surface sections which were previously not used because of a label shape can be used to display the terminal identification information.

In one embodiment, the display device can be configured to display new terminal identification information (in particular only) when supplied with electrical energy by means of the independent energy source such that, in the event of a new configuration of the electrical terminal, an accurate, new, i.e. modified, terminal identification information can be displayed by means of the display device. Furthermore, the terminal identification information can be prevented from being changed unintentionally.

In one embodiment, the display device can be formed as a bistable, i.e. based on bistable technology, display device, in particular as electronic paper (E-paper) or as a cholesteric liquid crystal display (ChLCD). This embodiment of the display device uses conventional technology and, at the same time, is particularly energy-saving since the display device only requires energy when the information to be displayed is changed. Furthermore, the terminal identification information remains visible even if an energy supply of the IO-Link module fails.

In an alternative embodiment, the display device can be formed as a liquid crystal display (LCD)-based display device or as an organic light-emitting diode (OLED)-based display device. Here, the IO-link module can additionally have its own internal energy source such that the energy supply for the electronic display device can also be ensured without an independent, in particular external, electrical energy source, and the display device can permanently display the terminal identification information. The internal or module-specific energy source can, for example, be designed in the form of a battery, a rechargeable accumulator or a capacitor, which can have a correspondingly large capacity and can be incorporated in a module-specific circuit. The terminal identification information can also be changed when the display device is supplied with energy by means of the internal energy source.

In one embodiment, upon initialisation of the IO-link module, i.e. when the IO-link module is put into operation for the first time, the terminal identification information may be able to be loaded from an engineering tool into a microcontroller of the IO-link module via an IO-link connection. The terminal identification information can thus be parameterisable and can be written to the microcontroller as a parameter by means of one or more IODD files for configuration. This can enable an automatic configuration of the terminal identification information in a particularly simple manner by means of the configuration possibilities specified in the IO-link standard, such that a higher configuration quality can be achieved with a lower amount of work.

In one embodiment, the terminal identification information may be able to be loaded from a parameter server of an IO-link master into the microcontroller of the IO-link module via an IO-link connection. As a result, in the event of a necessary reconfiguration of the IO-link module or in the event of a replacement of a defective IO-link module, the terminal identification information, which is stored in the parameter server in particular as a copy, can be loaded particularly easily and automatically into the IO-link module to be reconfigured or into a replaced IO-link module.

In particular, the terminal identification information, which can be loaded into the microcontroller, is able to be stored in a memory of the microcontroller and/or in a memory of the IO-link module, which may be present separately from the microcontroller.

In one embodiment, the display device can have an input function for inputting information, which can be formed, for example, as a touch screen, which can provide corresponding menu functions. As a result, a user can store additional information, for example an identification of the IO-link module formed as an IO-link device or a network address of the IO-link module formed as an IO-link master, in the microcontroller and in the meantime and/or later verify the information entered on the display device. The information to be input and displayed may also be the terminal identification information.

In one embodiment, the terminal identification information displayed by means of the display device can be rotatable depending on a spatial orientation of the IO-link module such that the assembly of the IO-link module can be carried out in a particularly simple and user-friendly manner since the displayed terminal identification information is realigned when the position of the IO-link module is changed.

In one embodiment, the display device can be configured to display at least one information selected from the group consisting of a terminal status information, configuration information of the IO-link module, information about a charge state of the energy source in the IO-link module (in particular formed as an IO-link wireless device), module-specific information, operating status information of the IO-link module and information about an operation of the IO-link module. Here, the terminal status information, i.e. information about a connected or error-free state or information about a disconnected or faulty state of the terminal, can replace the LEDs which are typically present in a device to display the respective state of the terminal. The configuration information of the IO-link module may comprise, for example, a software configuration, a downloaded software update, an allocation of the terminal as an input or as an output, etc. The module-specific information may comprise, for example, information such as a type designation of the IO-link module, a production date of the IO-link module, a serial number of the IO-link module, a software status of the IO-link module etc. The operating status information of the IO-link module can, for example, indicate an information about an operation outside of a device specification, which arises, for example, in the event of excess voltage or excess temperature, or can also indicate the number of working hours of the IO-link module. The information about an operation of the IO-link module may comprise, for example, operating instructions for the IO-link module or parts thereof. All these types of this additional information can be parameterisable and loaded into the microcontroller of the IO-link module by means of the engineering tool upon initialisation of the IO-link module and/or by means of the parameter server at a later point in time. In particular, the additional information may be able to be stored in the memory of the microcontroller and/or in the memory of the IO-link module, which may be present separately from the microcontroller. It is also possible to display the additional information as writing or as a symbol. For example, the allocation of a terminal can be displayed graphically. Overall, a particularly simple display of important information of the IO-link module can be achieved, which facilitates the maintenance of the IO-link module.

In one embodiment, the IO-link module can have a plurality of electronic, in particular digital, analogue and/or IO-link-based connections for connecting a corresponding electronic device, wherein the display device can be configured to display a terminal identification information for terminals of the plurality of terminals, in particular for all terminals of the plurality of terminals.

The terminals of the plurality of terminals can be arranged along two opposing edge regions of a surface of the in particular cuboid-shaped IO-link module, and the display device can extend between the two edge regions along the surface of the IO-link module. Alternatively, the terminals of the plurality of terminals can be arranged along a circumference on the in particular circular surface of the in particular cylindrically shaped IO-link module, and the display device can extend radially inside the terminals. Here, the terminals can be spaced apart at equal distances with respect to their respective adjacent terminals. Alternatively, the terminals of the plurality of terminals can be arranged in rows which are parallel to one another on a partial section of the in particular square surface of the in particular cuboid-shaped IO-link module, and the display device can extend adjacent to the terminals in a further opposing partial section of the surface. It has been noted that various combinations of a number of terminals, an arrangement of the terminals on the surface, a shape of the display device, a size of the display device and a position of the display device on the surface are conceivable. In particular, depending on the arrangement of the terminals and the display device with respect to each other, a particularly space-saving arrangement of the terminals and the display device can be achieved by using a free surface of the IO-link module which is not occupied by the electronic terminals. Furthermore, the arrangement of the display device on the IO-link module is particularly clear, such that the terminals identification information can be clearly visible.

In one embodiment, the IO-link module can be formed as an IO-link master or as an IO-link device. In this case, the IO-link master can be connected to the fieldbus, and the IO-link device can act as a slave of the IO-link master and at the same time serve as a connection to one or more device(s). The IO-link module can be configured to exchange information with the electronic device or electronic devices by wire or wirelessly. A wireless communicating IO-link module can be referred to as an IO-link wireless module. In particular the IO-link module can be formed as a component of an IO-link wireless system, i.e. a wireless communicating system.

According to a further aspect of the invention, a method for operating an IO-link module is provided which has at least one electrical terminal for connecting an electronic device and an electronic display device for displaying at least one terminal identification information of the at least one terminal, wherein the display device permanently displays the terminal identification information free from an energy supply by means of an electrical energy source which is independent of the IO-link module. In the method, the measures described with reference to the IO-link module can be implemented as method steps.

According to a further aspect of the invention, a control device for controlling an information display of an IO-link module is provided which has at least one electrical terminal for connecting an electronic device and an electronic display device for displaying at least one terminal identification information of the at least one terminal, wherein the control device is configured to load the terminal identification information into a microcontroller of the IO-link module such that the display device permanently displays the terminal identification information free from a supply of electrical energy by means of an electrical energy source which is independent of the IO-link module. Here, the control device can control the engineering tool and/or the IO-link module in such a way that, upon initialisation of the IO-link module, the terminal identification information can be loaded from the engineering tool into the microcontroller of the IO-link module via the fieldbus and a possibly present IO-link connection and optionally stored. Furthermore, the control device can control a parameter server in an IO-link master and/or the IO-link module such that the terminal identification information, which is stored in the parameter server in particular as a copy, is loaded into the microcontroller of the IO-link module via an IO-link connection and optionally stored. At least one of the additional information outlined above can also be loaded into the microcontroller of the IO-link module by means of the control device and optionally stored.

According to a further aspect of the invention, a method for controlling an information display of an IO-link module is provided which has at least one electrical terminal for connecting an electronic device and an electronic display device for displaying at least one terminal identification information of the at least one terminal, wherein the terminal identification information is loaded into a microcontroller of the IO-link module such that the display device permanently displays the terminal identification information free from a supply of electrical energy by means of an electrical energy source which is independent of the IO-link module. In the method, the measures described with reference to the IO-link module, which are controlled by the control device, can be implemented as method steps.

According to a further aspect of the invention, a computer program is provided which has the program code which, when executed by a microcontroller or control device, performs the method described above for operating an IO-link module or the method described above for controlling an information display of an IO-link module.

According to a further aspect of the invention, a computer program product is provided which has the computer program described above and is formed, for example, as a storage medium, e.g. as a hard disk.

BRIEF DESCRIPTION OF THE DRAWINGS

Exemplary embodiments of the invention are depicted in the drawings and are explained in more detail in the following description. Here are shown.

EMBODIMENTS OF THE INVENTION

Figure 1:
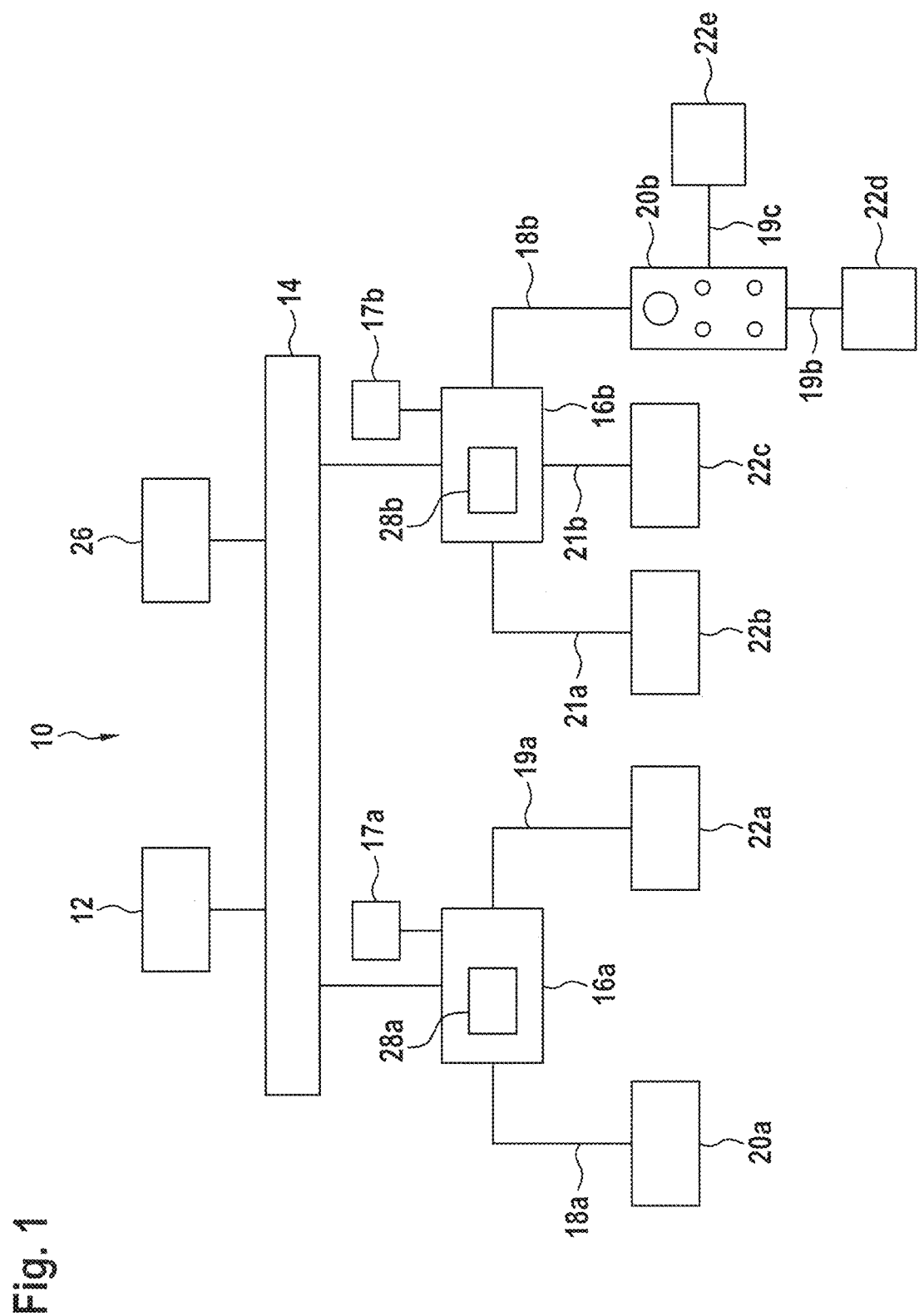
FIG. 1 a schematic depiction of a fieldbus system having a control device according to an exemplary embodiment and IO-link modules according to exemplary embodiments.

A fieldbus system 10 has a control device 12 according to an exemplary embodiment which is connected to a fieldbus 14. The fieldbus 14 is connected to a first IO-link master 16a according to an exemplary embodiment and to a second IO-link master 16b according to an exemplary embodiment via corresponding fieldbus connections. The first and second IO-link masters 16a, 16b are each connected to an energy source 17a, 17b which is independent of the corresponding IO-link master 16a, 16b and is designed as a power supply unit. The first IO-link master 16a is connected to an IO-link device 20a according to an exemplary embodiment by means of an IO-link connection 18a and to a device 22a by means of a digital connection 19a. The second IO-link master 16b is connected to devices 22b, 22c by means of corresponding analogue connections 21a, 21b and to an IO-link device 20b according to an exemplary embodiment by means of an IO-link connection 18b. The IO-link device 20b is connected to devices 22d, 22e via digital connections 19b, 19c. The devices 22a-22e can be formed as a sensor, actuator, display device, operating device or as a drive for a small machine.

An engineering tool 26 is connected to the fieldbus 14 and serves to configure the IO-link masters 16a, 16b and the IO-link devices 20a, 20b by the engineering tool 26 providing the required parameters during the operation of the IO-link masters 16a, 16b and the IO-link devices 20a, 20b. These parameters can be at least one terminal identification information, at least one terminal status information, at least one configuration information of the IO-link master 16a, 16b or the IO-link device 20a, 20b, at least one information about a charge state of an energy source in the IO-link device 20a, 20b formed as an IO-link wireless device, IO-link master- or IO-link device-specific information at least one operating status information of the IO-link master 16a, 16b or the IO-link devices 20a, 20b and at least one information about an operation of the IO-link master 16a, 16b or the IO-link device 20a, 20b. Each of the IO-link masters 16a, 16b has a parameter server 28a, 28b in which the parameters from the IO-link devices 20a, 20b configured in the IO-link devices 20a, 20b connected via the respective IO-link connection 18a, 18b are stored as a copy in order to reload this copy of the parameters at a later point in time into the, or also replaced, IO-link devices 20a, 20b.

With reference to FIG. 2 to 5, exemplary embodiments of the IO-link master 16a, 16b and the IO-link device 20a, 20b are described in more detail using the term "IO-link module 30". Elements of the IO-link module 30, which are only present in the IO-link master 16a, 16b or the IO-link device 20a, 20b, respectively, are explained separately.

The IO-link module 30 has a plurality of electrical terminals 36a-36i on a surface 32 of a cuboid-shaped module housing 34, said electrical terminals 36a-36i being arranged along axial edge regions of the module housing 34. Here, the terminals 36a-36d and the terminals 36e-36h lie respectively opposite one another in pairs. A display device 38 is provided on the surface 32 in a middle region of the housing 34, said display device 38 displaying terminal identification information for each terminal 36a-36i in a section of the display device 38 which is adjacent to the respective terminal 36a-36i. The terminal identification information and, optionally, the information described above can be loaded from the engineering tool 26 into a microcontroller 40 of the IO-link module 30. When the IO-link module 30 is configured as the IO-link master 16a, 16b, the IO-link module 30 has the parameter server 28, into which the terminal identification information and the additional information of the IO-link devices 20a, 20b can be stored as a copy. When the IO-link module 30 is formed as the IO-link device 20a, 20b and thus without the parameter server 28, the information stored in the parameter server 28 of the IO-link masters 16a, 16b as a copy is able to be loaded into the microcontroller 40 of the IO-link devices 20a, 20b.

In a first configuration, the display device 38 is formed as a bistable display, as electronic paper or as a ChLCD, but can also be formed in a second configuration as an LCD display or as an OLED display. In the second configuration, the IO-link module 30 additionally has an energy source 44, which is integrated in the module housing 34 and can, for example, be formed as a battery, as an accumulator or as a capacitor which is connected to a module-specific electrical circuit.

The display device 38 also has a first section 46a, a second section 46b and a third section 46c lying between the first section 46a and the second section 46b. The first and second sections 46a, 46b serve to permanently display the terminal identification information for the respectively adjacent terminals 36a-36i, while the third section 46c is equipped with touch screen functionality 48 to store additional information in the microcontroller 40 and at the same time to display this additional information in the third section 46c of the display device 38. This additional information may, for example, be an identification of the IO-link device 20a, 20b or, as shown in FIG. 3, a network address of the IO-link master 16a, 16b.

Figure 2:
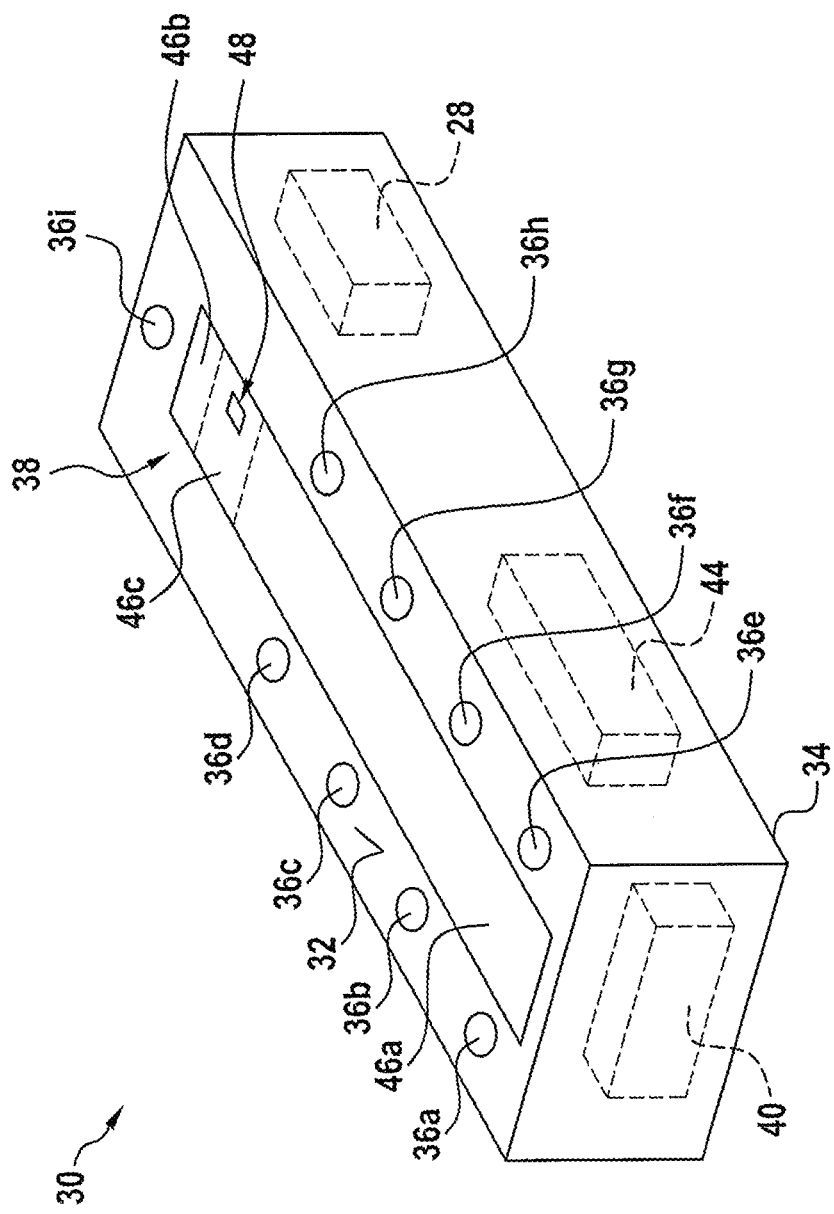
FIG. 2 to 5 schematic depictions of exemplary embodiments of the IO-link modules in FIG. 1.
Figure 3:
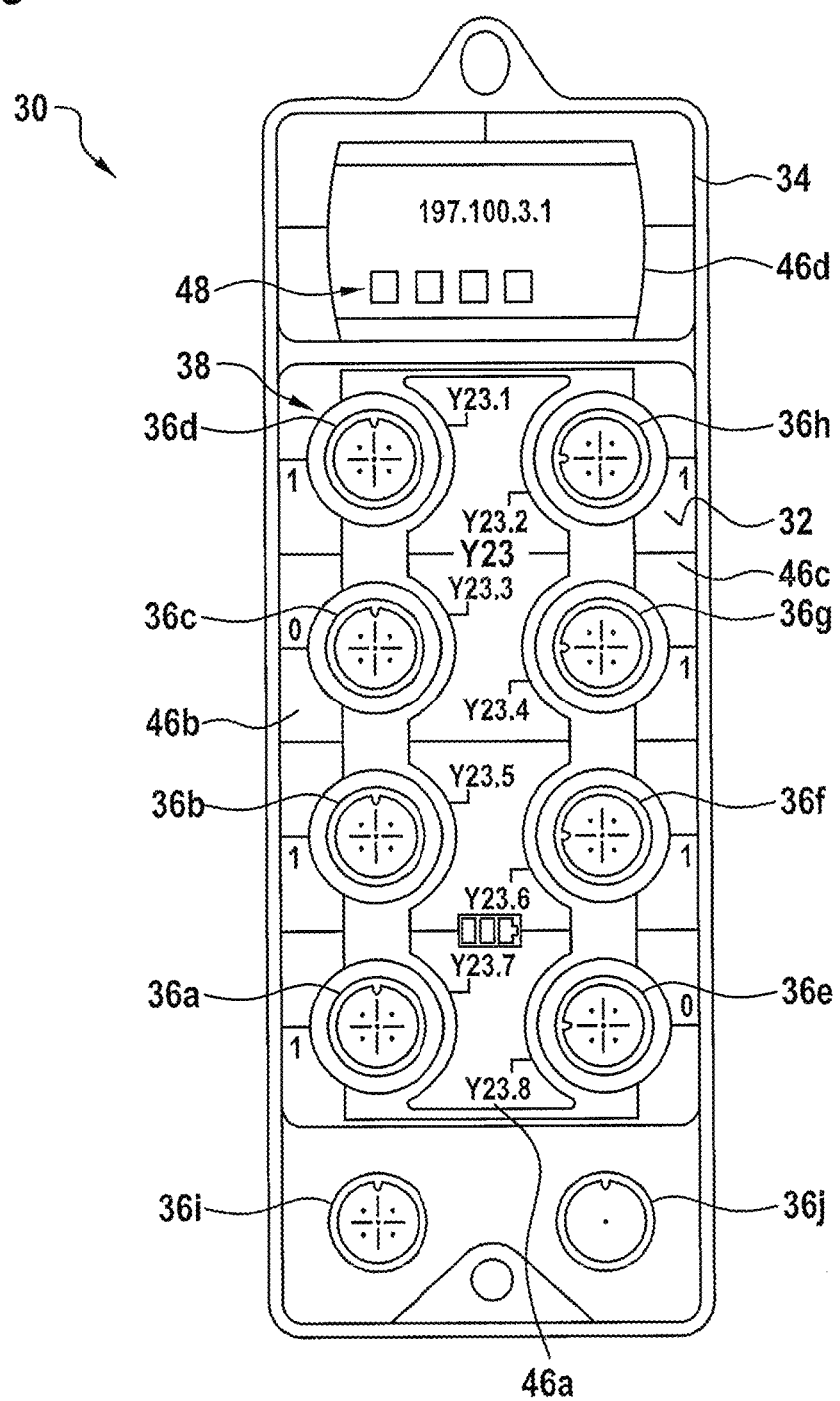

The exemplary embodiment of the IO-link module 30 shown in FIG. 3 is formed to be similar to the IO-link module 30 in FIG. 2. However, an entire surface 32 of a module housing 34 of the IO-link module 30 is provided with the display device 38. Here, only terminals 36a-36j are omitted. In a middle section 46a of the display device 38, said section 46a being located between the terminals 36a-36h, the terminal identification information of each terminal 36a-36i (referred to as "Y23", "Y23.1", . . . "Y23.8" in FIG. 3) is shown. In addition, information about an operation of the IO-link module 30, i.e. operating instructions thereof, can be displayed in the middle section 46a. In an edge section 46b, 46c of the display device 38, terminal status information of the terminals 36a-36h is indicated by displaying a "0" (terminal is not used or is defective) or a "1" (terminal is used respectively functions correctly). A touch screen 48 is formed in a section 46d of the display device 38, which is arranged at an end region of the module housing 34, to input additional information, for example an identification of the IO-link device 20a, 20b or a network address of the IO-link master 16a, 16b and to display it in the section 46d. Information about a charge state of the energy source 44 is indicated in the middle section 46a by means of a battery symbol which has a different number of bars depending on the charge state. Configuration information of the IO-link module 30, module-specific information and operating status information of the IO-link module 30 can be displayed by means of a corresponding symbol in the third section 46c, depending on the configuration, by the engineering tool 26. For example, the display device 38 can visually separate the middle section 46a, the edge sections 46b, 46c and the end section 46d from one another by corresponding colouring.

Figure 4:
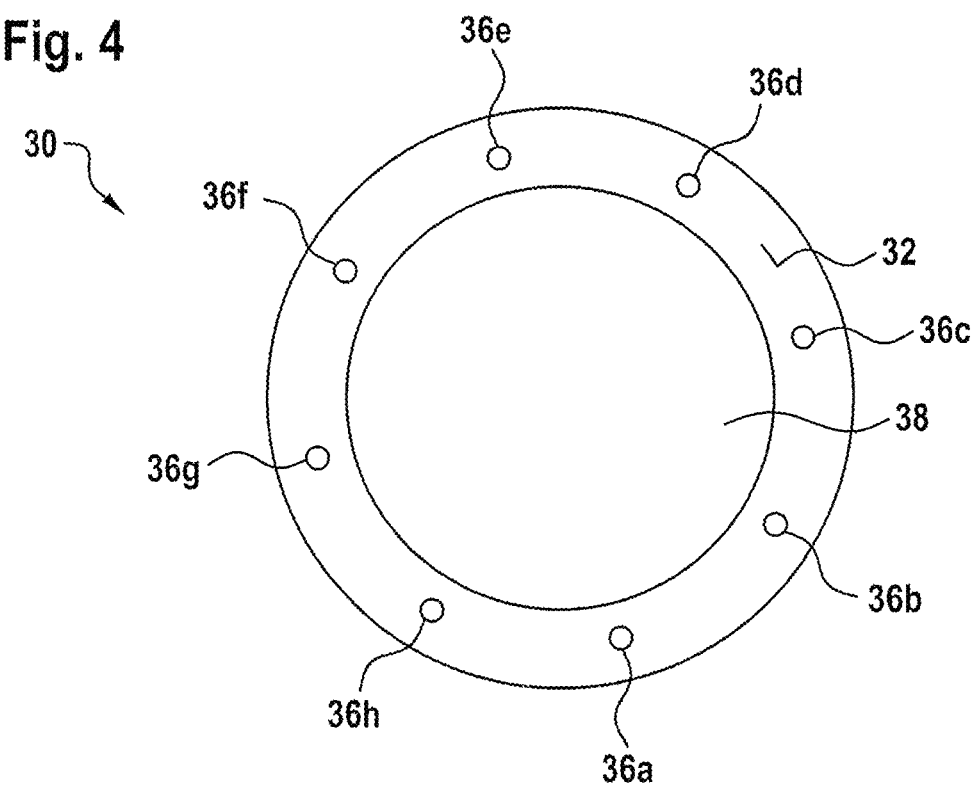

The exemplary embodiment of the IO-link module 30 shown in FIG. 4 is formed to be similar to the IO-link module 30 in FIGS. 2 and 3. However, the IO-link module 30 has a cylindrical module housing 34, on a circular surface 32 of which electrical terminals 36a-36h of a plurality of electrical terminals 36a-36h are arranged to be spaced apart from one another at equal distances along a circumference. A display device 38 is formed to be circular and is provided on the surface 32 radially inside the terminals 36a-36h.

Figure 5:
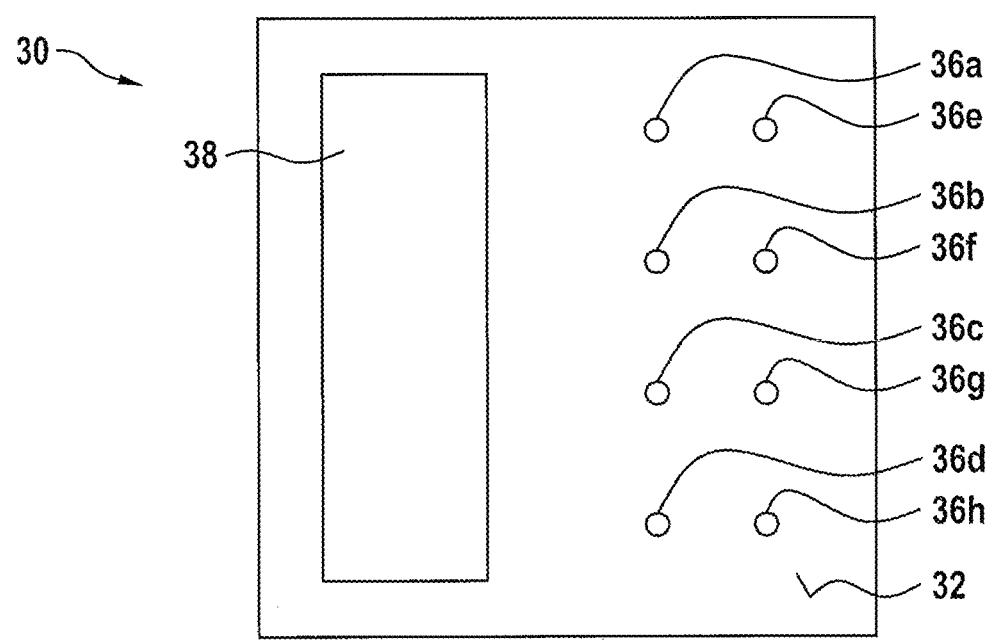

The exemplary embodiment of the IO-link module 30 shown in FIG. 5 is formed to be similar to the IO-link module 30 in FIGS. 2 and 3. However, the IO-link module 30 has a cuboid-shaped module housing 34, on a square surface 32 of which two rows of terminals 36a-36h of a plurality of electrical terminals 36a-36h are arranged to be spaced apart from one another at equal distances in a partial region of the surface 32. A display device 38 is formed to be oblong and is arranged in an adjacent partial region of the surface 32.

When the IO-link module 30 is put into operation for the first time, the terminal identification information and, optionally, the additional information are loaded into the microcontroller 40 by means of the engineering tool 26 in a method for controlling an information display of the IO-link module 30 according to an exemplary embodiment and/or in a method for operating the IO-link module 30 according to an exemplary embodiment. Here, the IO-link module 30 is supplied with power via the power supply unit 17a, 17b and optionally the corresponding IO-link connection 18a, 18b. After loading and displaying the terminal identification information and possibly the additional information, a power supply to the power supply unit 17a, 17b and optionally the respective IO-link connection 18a, 18b is interrupted. If the IO-link module 30 has the energy source 44, the display device 38 formed as an LCD or OLED display is supplied with energy in this operating state by means of the energy source 44. The IO-link module 30 is subsequently mounted at its operating site, and the displayed terminal identification information and additional information can be independently aligned relative to a base depending on the orientation of the mounted IO-link module 30 such that the displayed information is always visible in a familiar orientation for a viewer.

When the fieldbus system 10 is put into operation, the power supply unit 17a, 17b supplies energy and the IO-link connections 18a, 18b are optionally supplied with power such that the display device 38 of the IO-link module 30 is again also externally supplied with power. In this operating state, for example, the terminal identification information shown by the display device 38 can be changed by means of the engineering tool 26 or the touch screen 48.

In order to store the terminal identification information, which is stored in the microcontroller 40, as a copy in the parameter server 28 of the IO-link master 16a, 16b, the corresponding information is transferred from the microcontroller 40 into the parameter server 28, to then be reloaded if required into the microcontroller 40 of the IO-link device 20a, 20b, and/or after replacing the IO-link module 30 in the event of a defect with a new IO-link module 30, to be reloaded into a microcontroller 40 of a replaced IO-link module 30. The loading of information from the engineering tool 26 into the microcontroller 40 of the IO-link module 30, the loading of information into the parameter server 28 of the IO-link master 16a, 16b from the microcontroller 40 of the IO-link device 20a, 20b and the loading of information from the parameter servers 28 of the IO-link master 16a, 16b in the microcontroller 40 of the IO-link device 20a, 20b is thereby effected by appropriately controlling the participating entities by means of the control device 12.

A computer program according to an exemplary embodiment is configured, when executed on a processor of the control device 12 or a processor formed as the microcontroller 40 of the IO-link module 30, to cause the control device 12 or the IO-link module 30 to carry out the method described above for controlling the information display of the IO-link module 30 or the method described above for operating the IO-link module 30. The computer program can be stored on a computer program product according to an exemplary embodiment which is formed as a machine-readable storage medium.

The invention claimed is:

1. An IO-link module which has at least one electrical terminal for connecting an electronic device and an electronic display device for displaying at least one terminal identification information of the at least one terminal,
   wherein the display device is configured to permanently display the terminal identification information free from an energy supply using an electrical energy source which is independent of the IO-link module, and
   wherein the terminal identification information can be loaded from an engineering tool into a microcontroller of the IO-link module via an IO-link connection upon initialization of the IO-link module.

2. The IO-link module according to claim 1, wherein the display device is formed as a bistable display device.

3. The IO-link module according to claim 1, wherein the display device is formed as a liquid crystal-based display device or as an organic light-emitting diode-based display device.

4. The IO-link module according to claim 1, wherein the display device has an input function for inputting information.

5. The IO-link module according to claim 1, wherein the terminal identification information which is displayed by the display device can be rotated depending on a spatial orientation of the IO-link module.

6. The IO-link module according to claim 1, wherein the display device is configured to display at least one information selected from the group consisting of terminal status information of the at least one terminal, configuration information of the IO-link module, information about a charge state of an energy source in the IO-link module, module-specific information, operating status information of the IO-link module and information about an operation of the IO-link module.

7. The IO-link module according to claim 1, wherein the IO-link module has a plurality of electrical terminals for connecting a corresponding electronic device, wherein the display device is configured to display terminal identification information of the terminals.

8. The IO-link module according to claim 1, wherein the IO-link module is formed as an IO-link master or as an IO-link device and/or configured to exchange information with the electronic device by wire or wirelessly.

9. A method for operating an IO-link module which has at least one electrical terminal for connecting an electronic device and an electronic display device for displaying terminal identification information of the at least one terminal,
   wherein the display device permanently displays the terminal identification information free from an energy supply using an external energy source which is independent of the IO-link module, and
   wherein the terminal identification information is loaded from an engineering tool into a microcontroller of the IO-link module via an IO-link connection upon initialization of the IO-link module.

10. A non-transitory computer-readable medium containing instructions which, when executed by a microcontroller or control device, cause said microcontroller or control device to carry out each step of the method according to claim 9.

11. A control device for controlling an information display of an IO-link module which has at least one electrical terminal for connecting an electronic device and an electronic display device for displaying at least one terminal identification information of the at least one terminal, wherein the control device is configured to load the terminal identification information into a microcontroller of the IO-link module such that the display device permanently displays the terminal identification information free from supply with electrical energy using an energy source which is independent of the IO-link module.

12. A method for controlling an information display of an IO-link module which has at least one electrical terminal for connecting an electronic device and an electronic display device for displaying at least one terminal identification information of the at least one terminal, wherein the terminal identification information is loaded into a microcontroller of the IO-link module such that the display device permanently displays the terminal identification information free from supply with electrical energy using an energy source which is independent of the IO-link module.

13. An IO-link module which has at least one electrical terminal for connecting an electronic device and an electronic display device for displaying at least one terminal identification information of the at least one terminal,
   wherein the display device is configured to permanently display the terminal identification information free from an energy supply using an electrical energy source which is independent of the IO-link module, and
   wherein the terminal identification information can be loaded from a parameter server of an IO-link master into the microcontroller of the IO-link module via an IO-link connection.

* * * * *